United States Patent
De Sadeleer et al.

(10) Patent No.: US 9,259,018 B2
(45) Date of Patent: Feb. 16, 2016

(54) PARTIALLY HYDROLYSED CEREAL PROTEIN

(75) Inventors: Jos Willy Ghislain Corneel De Sadeleer, Holsbeek (BE); Daniele Marie-Antoinette Karleskind, Wezembeek-oppem (BE); Catharina Hillagonda McCrae, Bertem (BE); Elisa Margriet Maria Meheus, Ghent (BE)

(73) Assignee: CARGILL, INCORPORATED, Wayzata, MN (US)

( * ) Notice: Subject to any disclaimer, the term of this patent is extended or adjusted under 35 U.S.C. 154(b) by 310 days.

(21) Appl. No.: 12/530,928

(22) PCT Filed: Mar. 7, 2008

(86) PCT No.: PCT/EP2008/052770
§ 371 (c)(1),
(2), (4) Date: Sep. 11, 2009

(87) PCT Pub. No.: WO2008/110515
PCT Pub. Date: Sep. 18, 2008

(65) Prior Publication Data
US 2010/0105872 A1  Apr. 29, 2010

(30) Foreign Application Priority Data
Mar. 12, 2007  (EP) ..................... 07103956

(51) Int. Cl.
C07K 14/415 (2006.01)
C07K 1/14 (2006.01)
A23J 1/00 (2006.01)
A23J 3/18 (2006.01)
A23J 3/34 (2006.01)
A23L 1/305 (2006.01)

(52) U.S. Cl.
CPC .. *A23J 3/18* (2013.01); *A23J 3/346* (2013.01); *A23L 1/3053* (2013.01); *A23L 1/3055* (2013.01)

(58) Field of Classification Search
USPC ............ 426/54, 459, 522, 656; 530/375
See application file for complete search history.

(56) References Cited

U.S. PATENT DOCUMENTS 4,100,024 A     7/1978  Adler-Nissen
4,324,805 A *   4/1982  Olsen ...................... 426/46
4,346,122 A *   8/1982  Orthoefer et al. ............ 426/656
4,757,007 A     7/1988  Satoh et al.
5,273,773 A *  12/1993  Katayama et al. ............ 426/656
6,096,353 A *   8/2000  Meheus et al. ................ 426/53
6,261,624 B1*   7/2001  Hudson et al. ................ 426/573
2001/0031729 A1* 10/2001  Van Loon et al. ............... 514/12
2005/0053705 A1*  3/2005  Gao et al. ..................... 426/422
2011/0203489 A1*  8/2011  Constantz et al. ............ 106/817

FOREIGN PATENT DOCUMENTS

EP   0 363 771      4/1990
EP   0 672 352      9/1995
EP   1 512 328      3/2005
WO   02/19836       3/2002
WO   02/32232       4/2002
WO   2004/026048    4/2004
WO   2004/047549    6/2004

OTHER PUBLICATIONS

Hussain, A. et al.,"Response of genetically diverse wheat cultivars to proteolytic digestion of glutenin"; Journal of Genetics and Breeding; 1994, pp. 67-72,vol. 48, Publication No. 227 of the Department of Food Science, Publication No. 1581 of the Agriculture Canada Research Station; Canada.

Schmidt, D.G. et al.,"OPA-methode ter bepaling van de hydrolysegraad van wei-eiwithydrolysaten"; VMT NIZO-nieuws; Sep. 9, 1993; pp. 13-15, No. 19, (english abstract).

Stockham, John D.; "What is Particle Size: The Relationship Among Statistical Diameters".,J.D. Stockham & E.G. Fochtman editors, 1977, pp. 1-12, chapter 1, Ann Arbor Science Publishers Inc, Michigan USA.

* cited by examiner

*Primary Examiner* — Michele L Jacobson
*Assistant Examiner* — Bhaskar Mukhopadhyay

(57) ABSTRACT

A composition is disclosed comprising a partially hydrolyzed cereal protein. The partially hydrolyzed cereal protein is characterized in that 20% to 80% by weight has a molecular weight of 25 kDa or greater 8% by weight or less has a molecular weight of 1.4 kDa or lower and in that it has a nitrogen solubility index of 90% or greater at pH 1 to 10. The preferred cereal protein derives from wheat. Also disclosed is a process for producing the composition comprising providing a slurry having a degree of hydrolysis of 3 to 8, determining the pH, adjusting the pH of the slurry and separating the aqueous-soluble portion of the slurry. Compositions according to the invention find use as milk protein replacements and as components in nutritional supplements, sports drinks, or food products including beverages.

21 Claims, No Drawings

PARTIALLY HYDROLYSED CEREAL PROTEIN

FIELD OF THE INVENTION

The present invention relates to a composition comprising a partially hydrolysed cereal protein, a process for producing such compositions and the use of such compositions as a partial or complete replacement for other vegetable or animal proteins. More particularly, the present invention relates to a composition of partially hydrolysed cereal protein having similar properties to milk whey protein, to a process for preparing such compositions and uses of such compositions as a partial or complete replacement for milk protein.

BACKGROUND TO THE INVENTION

The main whey protein in milk is β-lactoglobulin which has a molecular weight of around 36 kDa. Other important whey proteins in milk are α-lactalbumin with a molecular weight of around 14.5 kDa and bovine serum albumin with a molecular weight of around 69 kDa. There is a need for vegetable (i.e. edible plant) protein analogues of animal derived proteins and, in particular, milk proteins for both social and health reasons. However, the taste, mouth feel and nutritional properties of milk proteins are difficult to reproduce using vegetable protein.

Vegetable proteins are, nevertheless, used in a number of different applications, including both food and non-food applications One vegetable protein which has been produced in a number of different forms, including both dried powder and liquid form, is soya protein. EP-A-1 512 328 discloses soluble soya protein and a method for producing such soluble soya protein using an enzyme, preferably a protease of fungal origin, to produce a material having high solubility and high anti-oxidant capacity without the normal bitterness and beany flavour associated with hydrolysed soy materials.

Other vegetable proteins useful because of cost, amino acid profile or other nutritional properties have, in practice, been more difficult to use, particularly in liquid form. Cereal proteins, for example wheat, are generally difficult to process because of the high proportion of insoluble and difficult to handle material. Cereal proteins would be particularly advantageous and products have, nevertheless, been developed using cereal proteins.

EP-A-0 672 352 relates to processes for the preparation of glutamine-rich peptides, in particular for use in food preparation. One of the particular glutamine-rich peptides disclosed in this document is based on wheat protein. However, the vegetable proteins, including the wheat proteins disclosed in EP-A-0 672 352, have extremely low molecular weights.

WO-A-2004/047549 discloses a process for preparing vegetable protein suspensions including wheat protein suspensions which are microbial stable without the addition of any preservatives and with a water activity of 0.4 to 0.9. These products have a wide range of degrees of hydrolysis which would result in varying molecular weight distribution.

A need exists for a composition comprising a vegetable protein which can be used as a milk protein replacement with generally similar properties, at least as regards solubility and average molecular weight to those of at least some of the milk proteins. In particular, it would be advantageous to provide a cereal protein having such properties.

The Applicants have surprisingly discovered that controlled separation of hydrolysed cereal proteins can provide a cereal protein with such beneficial properties and lead to a milk protein replacer for use in analogues of dairy products.

SUMMARY OF THE INVENTION

The present invention accordingly provides, in a first aspect, a composition comprising a partially hydrolysed cereal protein, characterised in that 20% to 80% by weight preferably 25% to 70% by weight, of the partially hydrolysed cereal protein has a molecular weight of 25 kDa or greater, 8% by weight or less of the partially hydrolysed cereal protein has a molecular weight of 1.4 kDa or lower and in that the partially hydrolysed cereal protein has a nitrogen solubility index (NSI) of 90% or greater, preferably 95% or greater at pH 1 to 10.

Preferably, the composition comprises 25% to 70% by weight, more preferably 30%, 35%, 40%, 45%, or 50% to 70% by weight, of the partially hydrolysed cereal protein with a molecular weight of 25 kDa or greater.

The great advantage of such a relatively high proportion of high molecular weight fraction of hydrolysed cereal protein is that such a molecular weight distribution more closely mimics the whey proteins in bovine milk and, consequently, the properties of such a composition comprising such a partially hydrolysed cereal protein are more closely analogous to those of milk protein. Additionally a partially hydrolyzed cereal protein according to the present invention is easily digestible, builds texture and enhances mouthfeel.

Preferably 7, 6 or 5% by weight or less of the partially hydrolysed cereal protein has a molecular weight of 1.4 kDa.

One of the great advantages of a composition comprising a partially hydrolysed cereal protein according to the present invention is that the solubility (as indicated by NSI) of the protein is good to excellent at generally all pH levels.

Not only are compositions comprising partially hydrolysed cereal proteins according to the present invention soluble (i.e. having an NSI of 90% or greater, 91% or greater or 95% or greater) at around neutral pH, they also have a high solubility over a range of pH, in particular between 6 to 7, 5 to 7, 4 to 7, 3 to 8, 2 to 8 or even 1 to 10. The present composition has, even over a large pH range of 1 to 10, an NSI (of the partially hydrolysed cereal protein) above 90%. This has great advantages in processing and uses of the composition comprising the partially hydrolysed cereal protein as a milk analogue.

The cereal protein according to the present invention may be derived from rye, barley, oats, maize, rice, spelt, millet, sorghum or wheat. However, the preferred cereal protein comprises (or is) wheat. Generally, all known types of wheat can be used to form a composition according to the present invention, including modified wheats such as de-aminated wheat. Generally all types of wheat protein are suitable, with the most preferred starting material being vital wheat gluten.

The volume average diameter of the partially hydrolysed wheat protein in aqueous solution is generally similar in size to the volume average diameter of native milk whey protein in aqueous solution. This is advantageous because the similar size profiles of the volume average diameter of the partially hydrolysed cereal protein and bovine milk whey protein mean that the partially hydrolysed cereal protein may be used more easily as a milk protein analogue. Preferably, the volume average diameter of the partially hydrolysed wheat protein is equal to or greater than 0.8 times the volume average diameter of milk whey protein.

The composition when the cereal comprises wheat of the present invention will usually comprise 3.5% by weight lipid or less, preferably 3% by weight lipid or less and more preferably 2%, most preferably 1%, even below 0.5%, by weight lipid or less (based on protein content in the composition) since lipid components tend to remain with the insoluble by-products during production.

The present invention provides, in a second aspect, a process for producing a composition comprising a partially hydrolysed cereal protein according to the first aspect, the process comprising: providing a slurry comprising a cereal protein having a degree of hydrolysis of 3 to 8, determining the pH of the slurry, adjusting the pH of the slurry to the pH region of lowest protein solubility, and separating the aqueous-soluble portion of the slurry.

An important part of the process of the second aspect of the invention is separation at the pH region of lowest protein solubility which is advantageous because of the beneficial properties it gives the composition as discussed in relation to the first aspect of the invention. Thus, after the step of determining the pH of the slurry, the determined pH is compared to the pH region of lowest protein solubility of the cereal protein. The pH of the slurry is then adjusted, using acid or alkali, to within the pH region of lowest protein solubility. Occasionally, the determined pH may already be within the pH region, in which case adjusting the pH may not be necessary.

Typically, the slurry will have a dry matter content of 5-10%, preferably 8-10%.

The process may be batch, semi-continuous or continuous.

The process may further comprise the partial hydrolysis of the cereal protein having a degree of hydrolysis of 3 to 8. The partial hydrolysis is usually performed in the presence of one or more enzymes.

The enzymes used for the present hydrolysis are hydrolyses, generally peptidases (proteases). The peptidases are selected from the group consisting of $\alpha$-amino-acyl-peptide hydrolyses (EC 3.4.1.), peptidyl-aminoacid hydrolases (EC 3.4.2.), dipeptide hydrolases (EC 3.4.3.), peptidyl peptide hydrolases (EC 3.4.4.), aminopeptidases (EC 3.4.11.), peptidylamino-acid hydrolases (EC 3.4.12.), dipeptidases (EC 3.4.13.), Dipeptidyl-peptidases and tripetidyl-peptidases (EC 3.4.14.), peptidyl-dipeptidases (EC 3.4.15.), serine-type carboxypeptidases (EC 3.4.16.), metallocarboxypeptidases (EC 3.4.17.), cysteine-type carboxypeptidases (EC 3.4.18.), omega peptidases (EC 3.4.19.), serine endopeptidases (EC 3.4.21.), cysteine endopeptidases (EC 3.4.22.), aspartic endopeptidases (EC 3.4.23.), metalloendopeptidases (EC 3.4.24.), threonine endopeptidases (EC 3.4.25.).

Two sets of subclasses of peptidases are recognized comprising exopeptidases and endopeptidases. These endopeptidases now include the previously known proteinases. Preferably, enzymes from bacterial, mammalian, fruit or leguminous origin are used.
Further examples of suitable enzymes include Alkalase, Neutrase, Amano protease M etc.

The process is preferably conducted using at least one endo protease, however a protease having both endo and exo protease properties may also be used. Alternatively, a mixture of endo and exo proteases may be used.

Enzymes that may be used in the process of the present invention include bacterial proteinase from *Bac. Subtilisis*, acid endo-protease and exo-peptidase from *Asp. Niger*, thermo-tolerant bacterial protease, neutral thermo-tolerant protease from *Bac. thermoproteolytcus*, papain, neutral bacterial proteinase or endoprotease from *Bac.* sp., neutral bacterial protease from *Bac. amyloliquefaciens*, alkaline proteinase (fungal, bacterial), endo-proteinase (serine-type; *Subtilisin* A, *Bac. licheniformis*), complex endo-protease & exo-peptidase from *Asp. oryzae*), bacterial metallo-protease from *Bac. amyloliquefaciens*.

The partial hydrolysis stage of the process is advantageously performed at a temperature appropriate to the protease or proteases used. In particular, the hydrolysis will usually be conducted at a temperature of 20 to 95° C., preferably of 37 to 75° C., more preferably from 55 to 75° C.

Similarly, the pH range for the hydrolysis is determined essentially by the nature of the protease used. Typically, the pH range for hydrolysis is between 5 and 8, more preferably between 5 and 6.5, most preferably between 5.5 and 6.0.

The appropriate dosage of enzyme (on a dry basis) on which the hydrolysis may be performed can vary over a wide range. The enzyme(s) may subsequently be inactivated (e.g. by heat at above 80° C.) although this is usually not necessary. Typically, the enzyme dosage (dry basis) is between 0.001% and 1%. The enzyme may be dosed in a single addition or a number of additions during the process in order to obtain the desired degree of hydrolysis. The enzyme dosage, and/or the incubation time, is adjusted to obtain cereal protein having the characteristics required including molecular weight-profile.

Because the cereal protein source may also comprise carbohydrate materials, preferably the process further comprises treating the slurry with at least one carbohydrase. Suitable enzymes include $\alpha$ or $\beta$ amylase pullulanase, and/or other similar enzymes.

The process of the present invention comprises a separating step at a pH in the region of minimal (i.e. lowest) protein solubility to separate the aqueous soluble and aqueous insoluble products of the process. The pH region of the lowest protein solubility generally corresponds to the isoelectric point of a protein. The pH region of the lowest protein solubility will not generally be a single pH but will be a region of 1, preferably 0.5, more preferably 0.25 and most preferably 0.1 pH units centred on a pH usually in the range of pH 5 to 8 depending on the protein. The region of lowest protein solubility is further characterized in that the nitrogen solubility index (NSI) does not differ more than 15% or, more preferably, 10% or 5%, from the lowest value that can be obtained for the NSI over the pH range 1 to 10.

Preferably, the solubility (NSI) of the soluble products (i.e. the composition comprising the partially hydrolysed cereal protein) following the separating step is 90% or greater, 91% or greater, preferably 95% or greater over the whole range of pH, preferably over pH 1 to 10. As discussed in relation to the first aspect of the present invention, the high solubility (determined as NSI) of the composition is a great benefit of the present invention in that the composition generally has a high solubility over a large range of pH.

Adjustment of pH is achieved preferably by addition of an aqueous solution containing HCl or NaOH but may, in addition or alternatively, be by addition of solutions containing acids including but not limited to citric acid, phosphoric acid, acetic acid, sulfuric acid and nitric acid, hydroxides of alkali metals and alkaline earth metals including but not limited to NaOH, KOH and Ca(OH)$_2$ and combinations thereof.

The separating step, to separate the soluble and insoluble products of the process, is preferably centrifugation but may, in addition or alternatively, be decantation, filtration, membrane filtration or other separation processes known to the skilled person, or combinations thereof.

The aqueous soluble products resulting from the separation step generally comprise (or correspond to) a composition as discussed in relation to the first aspect of the present invention.

The process may further comprise one or more washing steps of the aqueous insoluble products to (further) increase the yield of the aqueous soluble products.

If appropriate, the process of the present invention may further comprise at least one pasteurisation step (e.g. heating to 80° C.) or, in addition or alternatively, at least one sterilisation step may be used in the process. Similarly, evaporation (concentration) to a dry matter content of at least 40% by weight and/or drying steps may be used before or after each step of the process. Preferably, the concentration step and/or the drying step are performed after the separation step.

Generally any of the concentration steps may be conducted by using any type of evaporator such as a forced circulation evaporator, a falling film evaporator, a rising film evaporator, a scraped surface evaporator, plate evaporator and any other type of available evaporators.

Generally any of the drying steps may be conducted using any type of dryer such as a spray dryer, flash dryer, ring dryer, roll dryer, fluidized bed dryer or any other type of available dryers. Drying usually results in a product having less than 5-6 wt % moisture.

The process may comprise a simultaneous drying step and pasteurisation and/or sterilisation step by applying superheated steam.

Compositions according to the first aspect of the present invention find use as a milk protein replacement. They may also find uses as a component in nutritional supplements, sports drinks, beverages or food products or as a base for a taste improver or flavour enhancer as a functioning ingredient or as a fermentation nutrient, or find uses in pharmaceutical and/or cosmetic products.

The composition according to the invention can be used to produce protein supplemented food products for human consumption. Examples of protein supplemented food products include beverages, processed meats, frozen desserts, confectionery products, dairy-type products, sauce compositions, and cereal grain products.

A typical protein supplemented food product may have between 0.1 and 10 wt. %.

It is also important to note that the food products may be grouped into different or additional food categories. A specific food product may fall into more than one category (e.g. ice cream may be considered both a frozen dessert and a dairy-type product). The food products provided herein are for illustrative purposes only and are not meant to be an exhaustive list.

Examples of protein supplemented beverage products include smoothies, breakfast drinks, carbonated drinks, clear drinks, opaque drinks, near waters, infant formula, fruit juice beverages, yogurt beverages, coffee beverages, beer, dry beverage mixes, tea fusion beverages, sports beverages, soy liquors, soda, slushes, and frozen beverage mixes.

Examples of protein supplemented meat products include ground chicken products, water-added ham products, bologna, hot dogs, franks, chicken patties, chicken nuggets, beef patties, fish patties, surimi, bacon, luncheon meat, sandwich fillings, deli meats, meat snacks, meatballs, jerky, fajitas, bacon bits, injected meats, and bratwurst.

Examples of protein supplemented confectionery products include chocolates, mousses, chocolate coatings, yogurt coatings, cocoa, frostings, candies, energy bar, and candy bars.

Examples of protein supplemented diary-type products include yogurt, cheese, ice cream, whipped topping, coffee creamer, cream cheese, sour cream, cottage cheese, butter, mayonnaise, milk-based sauces, milk-based salad dressings, and cheese curds.

Examples of protein supplemented cereal grain products include breads, muffins, bagels, pastries, noodles, cookies, pancakes, waffles, biscuits, semolina, chips, tortillas, cakes, crackers, breakfast cereals, pretzels, dry bakery mixes, melba toast, breadsticks, croutons, stuffing, energy bars, doughnuts, cakes, popcorn, taco shells, fry coatings, batters, breading, crusts, brownies, pies, puffed soy cakes, crepes, croissants, flour, and polenta.

As used herein, the term "sauce compositions" refers to food products such as sauces, salad dressings, sandwich spreads, syrups, marinades, dips, and meat glazes. Examples of protein supplemented sauce compositions include salad dressings, nut butter spreads (e.g., peanut butter spreads), marinades, sauces, salsas, jams, cheeses sauces, mayonnaise, tartar sauce, soy humus, dips, fruit syrups, and maple syrups.

Examples of other protein supplemented products include tofu, formulated soy essence, powdered protein supplements, juice mixable protein supplements, foaming agents, clouding agents, baby foods, meatless balls, meat analogues, egg products (e.g., scrambled eggs), soups, chowders, broth, milk alternatives, soy-milk products, chili, spice mixes, sprinkles, soy whiz, salad topping, edible films, edible sticks, chewing gum, bacon bits, veggie bits, pizza crust barriers, soy pie, no-gas synthetic beans, soy helper, soy cotton candy, fruit bits, pizza rolls, mashed potatoes, spun soy protein fibre, soy roll-ups, extruded snacks, condiments, lotions, fries, gelatin dessert products, vitamin supplements, and pharmaceuticals.

The invention further relates to beverages containing from 0.5 to 10% aqueous soluble cereal protein (preferably wheat protein), preferably from 1% to 5% (on dry matter). The beverage further includes typical beverage ingredients.

These typical beverage ingredients include carbohydrates, proteins, peptides, amino acids, antioxidants, fats, vitamins, trace elements, electrolytes, intense sweeteners, edible acids, flavours and/or mixtures thereof.

Carbohydrates may be selected from monosaccharides, disaccharides, gelling starches, starch hydrolysates, dextrins, fibres, polyols and mixtures thereof.

The monosaccharides include tetroses, pentoses, hexoses and ketohexoses.

Typical disaccharides include sucrose, maltose, trehalulose, trehalose, isomaltulose, melibiose, kojibiose, sophorose, laminaribiose, isomaltose, gentiobiose, cellobiose, mannobiose, lactose, leucrose, maltulose, turanose and the like.

Starch hydrolysates are produced by the controlled acid or enzymatic hydrolysis of starch and can be subdivided into two specific categories, maltodextrins and glucose syrups and are characterized by DE number (dextrose equivalent). DE number is a measurement of the percentage of reducing sugars present in the syrup and calculated as dextrose on a dry weight basis. Maltodextrins have a DE number up to 20 whereas glucose syrups have a DE number greater than 20. Dextrins are prepared according to the dextrinisation method. Dextrinisation is a heat treatment of dry starch in the presence or absence of acid.

Gelling starches may include emulsified starches such as starch n-octenyl succinate.

The fibres may include polydextrose, arabinogalactan, chitosan, chitin, xanthan, pectin, cellulosics, konjac, gum Arabic, soy fibre, insulin, modified starch, hydrolysed guar, guar gum, beta-glucan, carageenan, locust bean gum, alginate, polyglycol alginate.

The vitamins may include vitamin A, vitamin C, vitamin E, vitamin B12, and the like.

The edible acids may be selected from phosphoric acid, citric acid, malic acid, succinic acid, adipic acid, gluconic acid, tartaric acid, fumaric acid and mixtures thereof. Preferably the pH range of the beverage is from about 2 to about 6.5.

The flavours may be selected from fruit flavours, botanical flavours and mixtures thereof. Preferred flavours are cola flavour, grape flavour, cherry flavour, apple flavour and citrus flavours such as orange flavour, lemon flavour, lime flavour, fruit punch and mixtures thereof. The amount of flavour depends upon the flavour or flavours selected, the flavour impression desired and the form of flavour used.

If desired, colouring agents may also be added. Any water-soluble colouring agent approved for food use can be utilized for the current invention. When desired, preservatives such as potassium sorbate and sodium benzoate may be added.

Gums, emulsifiers and oils can also be added in the beverage for texture and opacity purposes. Typical ingredients include carboxymethylcellulose, mono, di-glycerides, lecithin, pulp, cotton seed oil and vegetable oil. Foam stabilizing agents such as yucca, or yucca/quillaia extracts may also be added.

References in this specification to molecular weight and/or molecular weight distribution and similar properties refer to molecular weight of samples determined using size exclusion chromatography when compared with a standard of similar polydispersity as the anticipated product.

The test for determining the molecular weight distribution involves gel permeation chromatography using a Superose 12 column (Pharmacia) with 6 M urea in a 0.1-M Tris buffer (pH 8.5) as the mobile phase. Detection is performed by measurement of the light absorption at 220 nm.

The test for determining NSI is performed according to a slightly modified AACC method 46-23 and is measured at a specific pH. 1 g of sample is weighed and demineralised water is added up to 100 g. The content is mixed using a magnetic stirrer until dispersed. Maintaining the agitation, the pH is adjusted to the specific pH (pHa) by adding NaOH or HCl. Mixing is continued for 30 minutes using a magnetic stirrer. The dispersion is centrifuged at room temperature, at 4000 g for 20 minutes. The nitrogen content is measured in the supernatant, and in the original dispersion. In both cases the nitrogen content is determined according to the Kjeldahl method. NSI at pHa=((Nitrogen content of supernatant at pHa)×100)/(Nitrogen content of original dispersion).

Determining of particle size involves the use of a ZetaSizer Nano ZS (Malvern Instruments Ltd). Prior to the analysis, the samples are diluted using deionized water of 18 MΩ-cm containing 10 mM NaCl and filtered through a 0.22 μm filter.

In this specification, references to percentages are percentages by weight on a dry weight basis unless otherwise specified.

Features of the invention in relation to the first aspect of the invention are also applicable to the second aspect of the invention with appropriate modification. Similarly, features of the second aspect of the invention are also applicable to the first aspect of the invention with corresponding modification.

The invention is illustrated by the following, non-limiting Examples.

EXAMPLE 1

This example demonstrates the lab scale preparation of soluble wheat protein starting from ring dried vital wheat gluten (Gluvital IPH 21020, lot 01036058). The lab scale process includes the following steps:
  batch wise enzymatic hydrolysis of the insoluble vital wheat gluten to a limited degree of hydrolysis
  removal of the insoluble part by centrifugation
  freeze drying the remaining soluble hydrolyzed wheat protein fraction A 10% vital wheat gluten suspension was prepared by re-dispersing 263 g vital wheat gluten in 2237 g deionised water at 68.5° C. The enzyme used for protein hydrolysis, Corolase TS, was dosed into the hot water just before the addition of the wheat protein. The dosage was 0.3% on dry base vital wheat gluten or 0.75 g. Immediately after re-dispersion of the protein an alpha-amylase (Ban 480L) was added to hydrolyze the residual starch. The dosage was 0.06% on dry base vital wheat gluten or 0.15 g. The pH was adjusted from 5.5 to 5.7 by adding 0.1M NaOH. The hydrolysis reaction was performed for 1 hour at 68.5° C. and pH 5.7. To keep the temperature at 68.5° C. during enzymatic hydrolysis the reaction was performed in a vessel with double jacket through which hot water of 70° C. was circulated. After one hour a degree of hydrolysis of 4.2% was reached and approximately half of the hydrolyzed protein slurry is taken out of the reaction vessel. The degree of hydrolysis is determined by the OPA method (Schmidt, D. G., Robben, A. J. P. M, VMT, 19, 13-15, 1993). The insoluble fraction (fibres, insoluble protein and starch) is then removed on a laboratory centrifuge (Sorval Centrifuge, 8000 rpm, cooled at 10° C., (15 minutes). During this centrifugation step 1215 g hydrolyzed wheat protein slurry is separated into 1063 g supernatant (soluble fraction) and 152 g sediment (insoluble fraction). The soluble fraction is freeze dried. The degree of hydrolysis of the freeze dried soluble wheat protein amounts to 4.7%.

EXAMPLE 2

The rest of the slurry of Example 1 is further reacted at pH 5.7 and 68.5° C. with additional amounts of proteases to obtain a higher degree of hydrolysis in a relatively short time. Immediately after taking out half of the reaction slurry (reaction time 60 minutes), 0.375 g Corolase TS is added to the remaining part in the reaction vessel (~0.3% on dry base vital wheat gluten). After 3.5 hours an additional 0.375 g of Corolase TS is added. After 4 hours reaction (total reaction time) a degree of hydrolysis of 7.7% is reached and the rest of the hydrolyzed wheat protein slurry is taken out of the reaction vessel. The insoluble fraction (fibres, insoluble protein and starch) is then removed on a laboratory centrifuge (Sorval Centrifuge, 8000 rpm, cooled at 10° C., (15 minutes). During this centrifugation step 978 g hydrolyzed wheat protein slurry is separated into 786 g supernatant (soluble fraction) and 192 g sediment (insoluble fraction). The soluble fraction is freeze dried. The degree of hydrolysis of the freeze dried soluble wheat protein amounts to 8%.

Values of the protein fraction of products in various molecular weight ranges (kDa) are described in Table 1.

TABLE 1

| | Protein fraction (%) in the following molecular weight ranges (kDa) | | | |
|---|---|---|---|---|
| Product[a] | <1.4 | 1.4-14 | 14-25 | >25 |
| DH4.2 | 4.06 | 26.5 | 10.5 | 58.9 |
| DH7.7 | 6.72 | 44.9 | 12.9 | 35.5 |
| DH9.8 | 10.38 | 57.8 | 10.3 | 21.5 |

[a]DH measured on the slurry

Values of the particle diameter (volume average diameter D4,3) are described in Table 2 for products as a function of DH. Also included in Table 2 are typical particle size data for milk whey protein.

TABLE 2

| Product[b] | Particle diameter[a] (nm) | | | |
|---|---|---|---|---|
| | d10 | d50 | d90 | D4.3 |
| Milk whey | 2.1 | 3.2 | 5.8 | 3.7 |
| DH1.9 | 3.6 | 5.4 | 9.5 | 6.1 |
| DH9.8 | 1.4 | 2.1 | 3.9 | 2.4 |

[a]D4.3 = volume average diameter
Dx (x = 10, 50, 90) = diameter below which X % of the volume of particles lies.
[b]DH measured on the slurry Tables 3a, b and c indicate typical values of protein, carbohydrate and lipid in products according to the invention as hydrolysed before separation (Table 3a) and after separation into the soluble portion (Table 3b) and insoluble portion (Table 3c).

TABLE 3a

HWP = Hydrolyzed Wheat Protein
HWP As Is
(g/100 g powder)

| Protein | 71.7 |
|---|---|
| Carbohydrate | 19.3 |
| Lipid | 3.9 |

TABLE 3b

HWP Soluble
(g/100 g powder)

| Protein | 71.0 |
|---|---|
| Carbohydrate | 29.2 |
| Lipid | 0.0 |

TABLE 3c

HWP Insoluble
(g/100 g powder)

| Protein | 77.0 |
|---|---|
| Carbohydrate | 0.9 |
| Lipid | 12.2 |

EXAMPLE 3

This example demonstrates the pilot scale preparation of soluble wheat protein starting from ring dried hydrolyzed wheat gluten (HyProW IPH 21100, —Cargill). The pilot scale process includes the following steps:
pH adjustment
removal of the insoluble part by centrifugation
pasteurisation of the soluble fraction
concentration of the soluble fraction
spray drying the concentrated soluble hydrolyzed wheat protein fraction.

A hydrolysed wheat gluten suspension (8% dry substance) was prepared by re-dispersing 50 kg hydrolysed wheat gluten (HyProW IPH 21100, lot 01030131—Cargill) in 544 kg deionised water at 70° C. The hydrolyzed protein slurry had a degree of hydrolysis of 5.0. The degree of hydrolysis was determined by the OPA method (Schmidt, D. G., Robben, A. J. P. M, VMT, 19, 13-15, 1993). The pH was adjusted from 5.3 to 5.8 by addition of 1.25 kg NaOH-solution (7.5%). The insoluble fraction (fibres, insoluble protein and starch) was then removed on a disc centrifuge (Westfalia NA7-06-067). During this centrifugation step 595 kg hydrolyzed wheat protein slurry was separated into 391 kg supernatant (soluble fraction, with dry substance of 5.4%) and 204 kg sediment (insoluble fraction, with dry substance of 13%). The soluble fraction was pasteurized by heating from 70° C. to 80° C. (10 minutes heating time and 15 minutes holding time). The pasteurized solubles were then concentrated in a scraped surface evaporator (Convap) to increase the dry substance to 50%. The concentrated soluble hydrolyzed wheat protein was then spray-dried (Niro, FDS-4.0). After spray-drying 22 kg of soluble hydrolyzed wheat protein was obtained, at dry substance of 96%.

The Nitrogen Solubility Index of the soluble hydrolyzed wheat protein was above 98% over the whole pH range 3 to 7. In comparison, the Nitrogen Solubility Index of the starting material, hydrolysed wheat gluten (HyProW IPH 21100, lot 01030131—Cargill), was 90 to 61% over the range of 3 to 7. More than 50% of the protein had a molecular weight of larger than 25 kDA and only 5.4% of the protein was below 1.4 kDa (see Table 4).

The volume average diameter (d4,3) was at 4.4 microns which was slightly higher than that of milk whey protein (3.7 microns; Table 5).

TABLE 4

| Product | Protein fraction (%) in the following molecular weight ranges (kDa) | | | |
|---|---|---|---|---|
| | <1.4 | 1.4-14 | 14-25 | >25 |
| Example 3 | 5.36 | 31.6 | 10.3 | 52.7 |

D4,3 is the volume average diameter (also DeBrouker mean) as defined by Stockham J. D. (1977) 'What is particle size: The relationship among statistical diameters' In: Particle Size Analysis (J. D. Stockham & E. G. Fochtman, eds) Ann Arbor Science Publishers Inc, Michigan USA, chap 1.

TABLE 5

| Product | Particle diameter[a] (nm) | | | |
|---|---|---|---|---|
| | d10 | d50 | d90 | D4.3 |
| Milk whey | 2.1 | 3.2 | 5.8 | 3.7 |
| Example 3 | 2.6 | 3.9 | 6.8 | 4.4 |

[a]D4.3 = volume average diameter
Dx (x = 10, 50, 90) = diameter below which X % of the volume of particles lies.

EXAMPLE 4

Fortified Sports Drink

Recipes
Two types of fortified sports drinks based upon 1.3% and 2.7% respectively of aqueous Soluble Wheat Protein according to Example 3 were produced using the ingredients in Table 6.

TABLE 6

| | 1.3% | | 2.7% | |
|---|---|---|---|---|
| Ingredients | % | Wt. (g.) | % | Wt. (g.) |
| Water, RO, Beverage Bay | 88.989 | 3559.56 | 87.489 | 3499.56 |
| Soluble Wheat Protein | 1.300 | 52.00 | 2.700 | 108.00 |

TABLE 6-continued

|  | 1.3% | | 2.7% | |
| --- | --- | --- | --- | --- |
| Ingredients | % | Wt. (g.) | % | Wt. (g.) |
| Isomaltulose, Cargill | 6.000 | 240.00 | 6.000 | 240.00 |
| Trehalose, Cargill | 3.000 | 120.00 | 3.000 | 120.00 |
| Acesulfame K, 1% Solution, Nutrinova | 0.007 | 0.28 | 0.007 | 0.28 |
| Sucralose, 25% Sol'n, McNeil | 0.013 | 0.52 | 0.013 | 0.52 |
| Phosphoric Acid, 75% Sol'n, Penta | 0.100 | 4.00 | 0.200 | 8.00 |
| Monopotassium Phosphate, Astaris | 0.030 | 1.20 | 0.030 | 1.20 |
| Magnesium Chloride, Mallinkrodt | 0.100 | 4.00 | 0.100 | 4.00 |
| Salt, Cargill | 0.095 | 3.80 | 0.095 | 3.80 |
| Vitamin E, Bev Grade 500, BASF | 0.006 | 0.24 | 0.006 | 0.24 |
| Nat. Flv. SweetAM 918.004 FONA | 0.100 | 4.00 | 0.100 | 4.00 |
| Nat. Flv. Punch 852.312 FONA | 0.220 | 8.80 | 0.220 | 8.80 |
| Red 40 10% Sol'n, Sensient | 0.040 | 1.60 | 0.040 | 1.60 |
|  | 100.000 | 4000.00 | 100.000 | 4000.00 |

The procedure for producing the sports drinks was as follows.
1. Weigh water
2. Add Disperser Protein
3. Add vitamins and minerals
4. Add flavour, colour and sweeteners
5. Add Phosphoric Acid, measure pH After a month of storage, products were all acceptable as determined by individuals on a taste panel. Compared to similar products prepared with milk whey protein, products containing the product of Example 3, were "cleaner", containing less of the diacetyl notes from whey, especially the 2.7% beverages. The 2.7% aqueous Soluble Wheat Protein drink seems to have the cleanest taste with lack of off flavours.

EXAMPLE 5

Piña Colada Smoothie

| Recipe | g/L |
| --- | --- |
| Water | Q.S. |
| Aqueous Soluble Wheat Protein according to Example 3 | 33.50 |
| Pina Colada Blend 120905-15 (Cargill) | 450.00 |
|  | 1000.00 |

The aqueous Soluble Wheat Protein was hydrated for 10 min at 85° C. and was then blended with the Piña Colada Blend and water followed by pasteurisation.

This smoothie was considered by individuals on a taste panel as being a tasty beverage suitable for breakfast drink.

The invention claimed is:

1. A process for producing a partially hydrolysed, aqueous soluble cereal protein composition the process comprising:
   providing a cereal protein derived from the group consisting of rye, barley, oats, maize, rice, spelt, millet, sorghum and wheat,
   partially and enzymatically hydrolysing the cereal protein at a pH in the range of from 5.3 to 5.8 to a degree of hydrolysis of 3 to 8 to produce a slurry having a pH and comprising a partially hydrolysed cereal protein,
   determining the pH of the slurry,
   adjusting the pH of the slurry to a pH in a region of lowest protein solubility to produce an aqueous-soluble portion of the partially hydrolysed cereal protein and an aqueous-insoluble portion of the partially hydrolysed cereal protein, wherein 20% to 80% by weight of the soluble, partially hydrolysed cereal protein has a molecular weight of 25 kDa or greater and wherein 8% by weight or less of the soluble, partially hydrolysed cereal protein has a molecular weight of 1.4 kDa or lower, and wherein the soluble, partially hydrolysed cereal protein has a nitrogen solubility index (NSI) of 90% or greater at pH 1 to 10; and
   separating the aqueous-soluble portion from the aqueous-insoluble portion.

2. The process of claim 1, wherein the cereal protein is from wheat.

3. The process of claim 1, further comprising concentrating the aqueous-soluble portion of the partially hydrolysed cereal protein to a dry matter content of at least 40% by weight.

4. The process of claim 1, wherein the separating step comprises centrifugation.

5. The process of claim 1, which further comprises drying the aqueous-soluble portion of the partially hydrolysed cereal protein.

6. The process of claim 1, which further comprises pasteurizing the aqueous-soluble portion of the partially hydrolysed cereal protein or sterilizing the aqueous-soluble portion of the partially hydrolysed cereal protein.

7. The process of claim 1, further comprising the step of using the partially hydrolysed cereal protein of the aqueous soluble portion in a food product.

8. The process of claim 7, wherein the food product comprises a beverage.

9. The process of claim 7, wherein the food product is a milk protein replacement.

10. The process of claim 7, wherein the food product is a nutritional supplement.

11. The process of claim 8, wherein the beverage is a sports drink.

12. The process of claim 2, wherein the aqueous soluble portion comprises 3.5% by weight or less of lipid based on the total weight of proteins in the aqueous soluble portion.

13. The process of claim 1, wherein 25% to 70% by weight of the soluble, partially hydrolysed cereal protein has a molecular weight of 25 kDa or greater, and the soluble, partially hydrolysed cereal protein has a nitrogen solubility index (NSI) of 95% or greater at pH 1 to 10.

14. The process of claim 1, wherein the cereal protein is from wheat.

15. The process of claim 1, wherein the step of partially and enzymatically hydrolysing the cereal protein comprises using at least one endo protease.

16. The process of claim 1, wherein the step of partially and enzymatically hydrolysing the cereal protein comprises using a protease having both endo and exo protease properties or a mixture of exo and endo proteases.

17. The process of claim 3, wherein the step of partially and enzymatically hydrolysing the cereal protein comprises using at least one carbohydrase.

18. The process of claim 1, further comprising washing the aqueous insoluble portion to increase the yield of the aqueous soluble portion.

19. The process of claim 3, further comprising heating the aqueous soluble portion to 80° C.

20. The process of claim 1, further comprising drying the aqueous soluble portion to less than 6 weight percent moisture.

21. The process of claim 20, further comprising sterilization using superheated steam.

* * * * *